United States Patent
Ghigliotty Rosado et al.

(10) Patent No.: US 12,480,406 B2
(45) Date of Patent: Nov. 25, 2025

(54) TURBINE VANE FOR A GAS TURBINE ENGINE

(71) Applicant: RTX Corporation, Farmington, CT (US)

(72) Inventors: Jaime G. Ghigliotty Rosado, Cabo Rojo, PR (US); Brandon W. Spangler, Vernon, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/628,322

(22) Filed: Apr. 5, 2024

(65) Prior Publication Data

US 2025/0314174 A1 Oct. 9, 2025

(51) Int. Cl.
*F01D 5/18* (2006.01)
*F01D 9/04* (2006.01)

(52) U.S. Cl.
CPC .......... *F01D 5/187* (2013.01); *F01D 9/041* (2013.01); *F05D 2260/22141* (2013.01)

(58) Field of Classification Search
CPC . F01D 5/187; F01D 9/041; F05D 2260/22141
See application file for complete search history.

(56) References Cited

U.S. PATENT DOCUMENTS

| | | | | |
|---|---|---|---|---|
| 3,902,820 A | * | 9/1975 | Amos | F01D 5/189 416/193 A |
| 3,930,748 A | * | 1/1976 | Redman | F01D 5/189 415/115 |
| 4,153,386 A | * | 5/1979 | Leogrande | F01D 5/188 415/117 |
| 4,252,501 A | * | 2/1981 | Peill | F01D 9/065 415/115 |
| 4,297,077 A | * | 10/1981 | Durgin | F01D 5/189 415/115 |
| 4,616,976 A | * | 10/1986 | Lings | F01D 5/186 415/114 |
| 5,120,192 A | * | 6/1992 | Ohtomo | F01D 5/189 415/115 |

(Continued)

OTHER PUBLICATIONS

EP Search Report for EP Patent Application No. 25168693.7 dated Jul. 29, 2025.

*Primary Examiner* — Brian Christopher Delrue
(74) *Attorney, Agent, or Firm* — Getz Balich LLC

(57) ABSTRACT

A turbine vane includes a vane body, a baffle, and a plurality of axial divider ribs. The vane body includes a first side wall, a second side wall, and a trailing edge rib forming a cooling passage. The baffle includes a baffle body disposed within the cooling passage. The baffle body includes a first baffle side and a second baffle side. The baffle body forms an internal baffle cavity. The baffle body further forms a plurality of baffle apertures. Each axial divider rib extends between and to the second side wall and the second baffle side. The vane body, the baffle body, and the axial divider ribs form a feed cavity and one or more axial flow channels. The feed cavity is disposed between the vane body and the baffle body at least between the first side wall and the first baffle side. The axial flow channels are formed by the axial divider ribs. Each axial flow channel o is connected in fluid communication with the internal baffle cavity by one or more of the baffle apertures.

19 Claims, 6 Drawing Sheets

(56) References Cited

U.S. PATENT DOCUMENTS

| | | | | |
|---|---|---|---|---|
| 5,516,260 | A * | 5/1996 | Damlis | F01D 5/189 415/115 |
| 5,690,472 | A * | 11/1997 | Lee | F01D 5/187 416/97 R |
| 5,762,471 | A * | 6/1998 | Cunha | F01D 5/189 415/115 |
| 6,200,087 | B1 * | 3/2001 | Tung | F01D 5/186 415/115 |
| 6,382,908 | B1 * | 5/2002 | Keith | F01D 5/189 415/115 |
| 6,416,275 | B1 * | 7/2002 | Itzel | F01D 5/189 416/115 |
| 6,474,947 | B1 * | 11/2002 | Yuri | F01D 5/186 416/97 R |
| 6,929,445 | B2 * | 8/2005 | Zatorski | F01D 5/188 415/115 |
| 7,921,654 | B1 * | 4/2011 | Liang | F01D 5/186 415/115 |
| 8,142,153 | B1 * | 3/2012 | Liang | F01D 9/04 416/97 R |
| 10,087,776 | B2 * | 10/2018 | Lacy | F01D 25/12 |
| 10,480,329 | B2 * | 11/2019 | Spangler | F01D 25/12 |
| 10,662,783 | B2 * | 5/2020 | Spangler | F01D 5/189 |
| 10,669,861 | B2 * | 6/2020 | Spangler | F01D 5/187 |
| 10,830,056 | B2 * | 11/2020 | Erno | F01D 9/065 |
| 2002/0090294 | A1 * | 7/2002 | Keith | F01D 9/04 415/115 |
| 2003/0031555 | A1 | 2/2003 | Noe | |
| 2003/0068222 | A1 * | 4/2003 | Cunha | F01D 5/189 415/115 |
| 2014/0075947 | A1 * | 3/2014 | Gautschi | F01D 5/189 60/726 |
| 2016/0102563 | A1 | 4/2016 | Spangler | |
| 2017/0058679 | A1 | 3/2017 | Spangler | |
| 2023/0043718 | A1 * | 2/2023 | Preuss | F01D 5/188 |

* cited by examiner

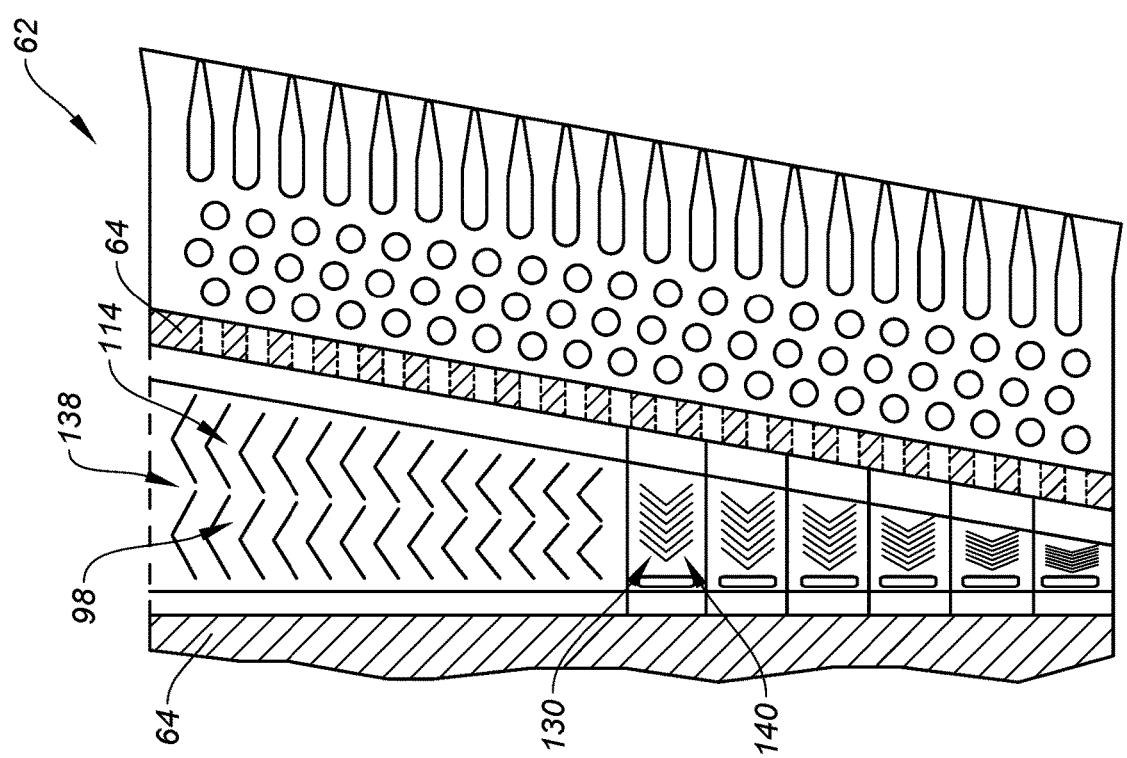
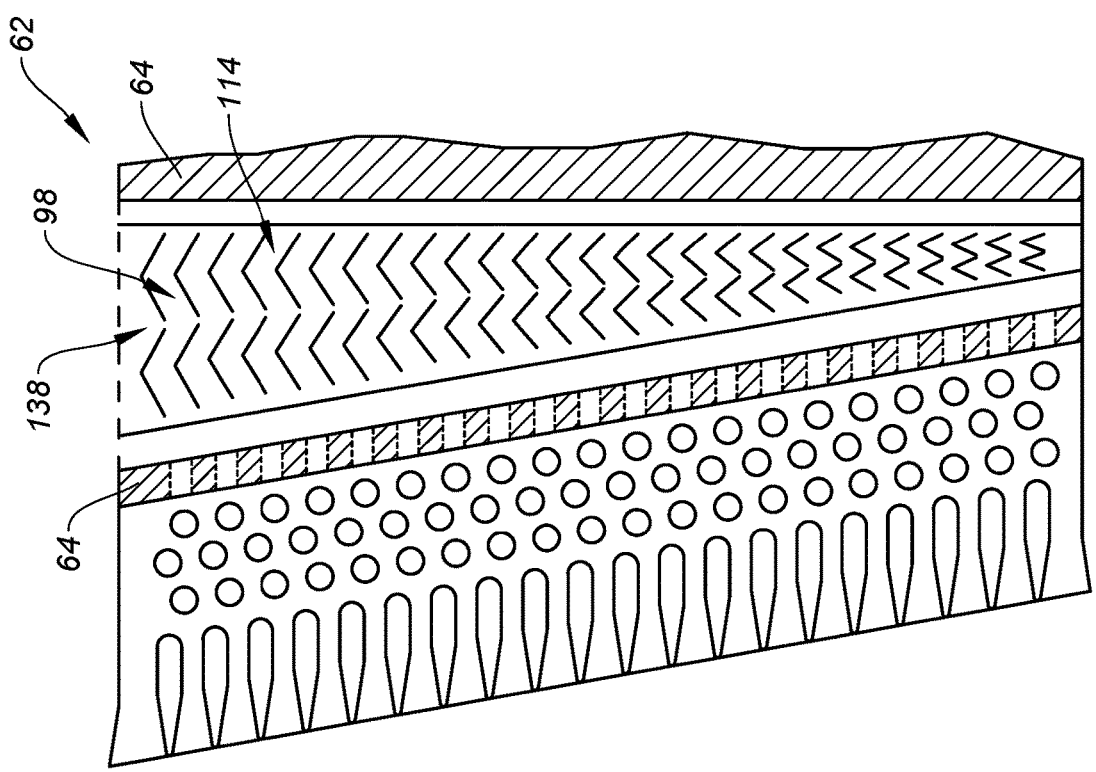

TURBINE VANE FOR A GAS TURBINE ENGINE

BACKGROUND

1. Technical Field

This disclosure relates generally to gas turbine engines and, more particularly, to turbine vanes for a gas turbine engine.

2. Background Information

A gas turbine engine typically includes a turbine section. The turbine section may include one or more turbines such as, but not limited to, a low-pressure turbine and a high-pressure turbine. These turbines may include multiple stages of blades and vanes. As fluid flows through the turbine section, the flow causes the blades to rotate about an axis of rotation. The vanes may be used to redirect the fluid flow to improve the effectiveness of the fluid for driving rotation of the downstream blades. Temperatures within the turbine section may be relatively high, as the flow of fluid is received initially from a combustor of the gas turbine engine. Cooling air may be extracted from a compressor section of the gas turbine engine and used to cool the gas path components, for example, the blades and vanes of the turbines. Various turbine vane configurations are known in the art for mitigating the impact of high turbine section temperatures on vane materials. While these known turbine vane configurations may be suitable for their intended purposes, there is always room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a turbine vane for a gas turbine engine includes a vane body, a baffle, and a plurality of axial divider ribs. The vane body extends between and to a leading edge and a trailing edge. The vane body extends between and to an inner diameter vane end and an outer diameter vane end. The vane body includes a first side wall, a second side wall, and a trailing edge rib. The trailing edge rib extends between and connects the first side wall and the second side wall. The first side wall, the second side wall, and the trailing edge rib form a cooling passage at the trailing edge. The vane body further forms a plurality of cooling holes at the trailing edge. The baffle includes a baffle body. The baffle body is disposed within the cooling passage. The baffle body includes a first baffle side and a second baffle side. The first baffle side faces the first side wall. The second baffle side faces the second side wall. The baffle body forms an internal baffle cavity. The baffle body further forms a plurality of baffle apertures connected in fluid communication with the internal baffle cavity. The plurality of baffle apertures are disposed at the second baffle side. Each axial divider rib of the plurality of axial divider ribs extends between and to a leading rib end and a trailing rib end. The leading rib end is disposed at the trailing edge rib. The trailing rib end is disposed at the plurality of cooling holes. Each axial divider rib of the plurality of axial divider ribs extends between and to the second side wall and the second baffle side. The vane body, the baffle body, and the axial divider ribs form a feed cavity and one or more axial flow channels. The feed cavity is disposed between the vane body and the baffle body at least between the first side wall and the first baffle side. The feed cavity is connected in fluid communication with the plurality of cooling holes. Each axial flow channel of the one or more axial flow channels is formed by and between adjacent axial divider ribs of the plurality of axial divider ribs. Each axial flow channel of the one or more axial flow channels is connected in fluid communication with the internal baffle cavity by one or more of the plurality of baffle apertures. Each axial flow channel of the one or more axial flow channels is connected in fluid communication with the plurality of cooling holes.

In any of the aspects or embodiments described above and herein, the baffle body may extend between a leading baffle end and a trailing baffle end. The leading baffle end may be disposed at the trailing edge rib. The plurality of baffle apertures may be disposed on the second baffle side at the leading baffle end.

In any of the aspects or embodiments described above and herein, the vane body may have a span extending between and to the inner diameter vane end and the outer diameter vane end. The baffle apertures, the plurality of axial divider ribs, and the one or more axial flow channels may be disposed within a spanwise portion of the span at the inner diameter vane end.

In any of the aspects or embodiments described above and herein, the spanwise portion may be less than or equal to fifty percent of the span.

In any of the aspects or embodiments described above and herein, the vane body may have a span extending between and to the inner diameter vane end and the outer diameter vane end. The baffle apertures, the plurality of axial divider ribs, and the one or more axial flow channels may be disposed between the outer diameter vane end and the inner diameter vane end along the span.

In any of the aspects or embodiments described above and herein, the first side wall may be a pressure side wall of the vane body and the second side wall may be a suction side wall of the vane body. The pressure side wall may form a pressure side surface of the turbine vane. The suction side wall may form a suction side surface of the turbine vane.

In any of the aspects or embodiments described above and herein, the turbine vane may further include flow augmentation features disposed in the feed cavity. The flow augmentation features may be formed by one or both of the vane body and the baffle body.

In any of the aspects or embodiments described above and herein, the turbine vane may further include flow augmentation features disposed in each axial flow channel of the one or more axial flow channels. The flow augmentation features may be formed by one or both of the vane body and the baffle body.

In any of the aspects or embodiments described above and herein, the feed cavity may be further disposed between the second side wall and the second baffle side. The feed cavity, between the second side wall and the second baffle side, may extend from the outer diameter vane end to the plurality of axial divider ribs.

In any of the aspects or embodiments described above and herein, the baffle body may extend between and to an inner diameter baffle end and an outer diameter baffle end. The inner diameter baffle end may be disposed at the inner diameter vane end. The outer diameter baffle end may be disposed at the outer diameter vane end.

According to another aspect of the present disclosure, a gas turbine engine for an aircraft propulsion system includes a compressor section and a turbine section. The turbine section includes a turbine vane stage. The turbine vane stage includes a plurality of turbine vanes. A first turbine vane of the plurality of turbine vanes includes a vane body, a baffle, and a plurality of axial divider ribs. The vane body extends between and to a leading edge and a trailing edge. The vane body extends between and to an inner diameter vane end and an outer diameter vane end. The vane body includes a first side wall, a second side wall, and a trailing edge rib. The first side wall, the second side wall, and the trailing edge rib form a cooling passage at the trailing edge. The vane body further forms a plurality of cooling holes at the trailing edge. The baffle includes a baffle body. The baffle body is disposed within the cooling passage. The baffle body includes a first baffle side and a second baffle side. The baffle body forms an internal baffle cavity. The internal baffle cavity is connected in fluid communication with the compressor section at the outer diameter vane end. The baffle body further forms a plurality of baffle apertures disposed at the second baffle side. Each axial divider rib of the plurality of axial divider ribs extends between and to the second side wall and the second baffle side. The vane body, the baffle body, and the axial divider ribs form a feed cavity and one or more axial flow channels. The feed cavity is connected in fluid communication with the compressor section at the outer diameter vane end. The feed cavity is disposed between the vane body and the baffle body. The feed cavity is connected in fluid communication with the plurality of cooling holes. Each axial flow channel of the one or more axial flow channels is formed by and between adjacent axial divider ribs of the plurality of axial divider ribs. Each axial flow channel of the one or more axial flow channels is connected in fluid communication with the internal baffle cavity by one or more of the plurality of baffle apertures. Each axial flow channel of the one or more axial flow channels is connected in fluid communication with the plurality of cooling holes.

In any of the aspects or embodiments described above and herein, the turbine vane may form a first air flow path of pressurized air from the compressor section. The first air flow path may extend from the outer diameter vane end, through the feed cavity to the plurality of cooling holes, and out of the turbine vane from the plurality of cooling holes.

In any of the aspects or embodiments described above and herein, the turbine vane may form a second air flow path of the pressurized air from the compressor section. The second air flow path may extend from the outer diameter vane end, through the baffle cavity, through the plurality of baffle apertures to the one or more axial flow channels, through the one or more axial flow channels to the plurality of cooling holes, and out of the turbine vane from the plurality of cooling holes.

In any of the aspects or embodiments described above and herein, the vane body may have a span extending between and to the inner diameter vane end and the outer diameter vane end. The baffle apertures, the plurality of axial divider ribs, and the one or more axial flow channels may be disposed within a spanwise portion of the span at the inner diameter vane end.

In any of the aspects or embodiments described above and herein, the first side wall may be a pressure side wall of the vane body and the second side wall may be a suction side wall of the vane body. The pressure side wall may form a pressure side surface of the turbine vane. The suction side wall may form a suction side surface of the turbine vane.

According to another aspect of the present disclosure, a turbine vane for a gas turbine engine includes a vane body, a baffle, and a plurality of axial divider ribs. The vane body extends between and to a leading edge and a trailing edge. The vane body extends in a spanwise direction between and to an inner diameter vane end and an outer diameter vane end. The vane body includes a first side wall, a second side wall, and a trailing edge rib. The first side wall, the second side wall, and the trailing edge rib form a cooling passage at the trailing edge. The vane body further forms a plurality of cooling holes at the trailing edge. The baffle includes a baffle body. The baffle body is disposed within the cooling passage. The baffle body includes a first baffle side and a second baffle side. The baffle body forms an internal baffle cavity. The baffle body further forms a plurality of baffle apertures. The plurality of baffle apertures are disposed at the second baffle side. Each axial divider rib of the plurality of axial divider ribs extends between and to a leading rib end and a trailing rib end. The leading rib end is disposed at the trailing edge rib. The trailing rib end is disposed at the plurality of cooling holes. Each axial divider rib of the plurality of axial divider ribs extends between and to the second side wall and the second baffle side. The vane body, the baffle body, and the axial divider ribs form a feed cavity and one or more axial flow channels. The feed cavity is disposed between the vane body and the baffle body outside of the one or more axial flow channels. The feed cavity is connected in fluid communication with the plurality of cooling holes. Each axial flow channel of the one or more axial flow channels is formed by and between adjacent axial divider ribs of the plurality of axial divider ribs. The one or more axial flow channels extend perpendicular to the spanwise direction from the leading rib end to the trailing rib end. Each axial flow channel of the one or more axial flow channels is connected in fluid communication with the internal baffle cavity by one or more of the plurality of baffle apertures. Each axial flow channel of the one or more axial flow channels is connected in fluid communication with the plurality of cooling holes.

In any of the aspects or embodiments described above and herein, the baffle body may extend between a leading baffle end and a trailing baffle end. The leading baffle end may be disposed at the trailing edge rib. The plurality of baffle apertures may be disposed on the second baffle side at the leading baffle end.

In any of the aspects or embodiments described above and herein, the first side wall may be a pressure side wall of the vane body and the second side wall may be a suction side wall of the vane body. The pressure side wall may form a pressure side surface of the turbine vane. The suction side wall may form a suction side surface of the turbine vane.

In any of the aspects or embodiments described above and herein, the feed cavity may be further disposed between the second side wall and the second baffle side. The feed cavity between the second side wall and the second baffle side extends from the outer diameter vane end to the plurality of axial divider ribs.

In any of the aspects or embodiments described above and herein, the baffle body may extend between and to an inner diameter baffle end and an outer diameter baffle end. The inner diameter baffle end may be disposed at the inner diameter vane end. The outer diameter baffle end may be disposed at the outer diameter vane end.

The present disclosure, and all its aspects, embodiments and advantages associated therewith will become more readily apparent in view of the detailed description provided below, including the accompanying drawings.

BRIEF DESCRIPTION OF THE DRAWINGS

FIG. 8 schematically illustrates a cutaway, side view of another turbine vane at a pressure side of the turbine vane, in accordance with one or more embodiments of the present disclosure.

FIG. 9 schematically illustrates a cutaway, side view of the turbine vane of FIG. 8 at a suction side of the turbine vane, in accordance with one or more embodiments of the present disclosure.

DETAILED DESCRIPTION

Figure 1:
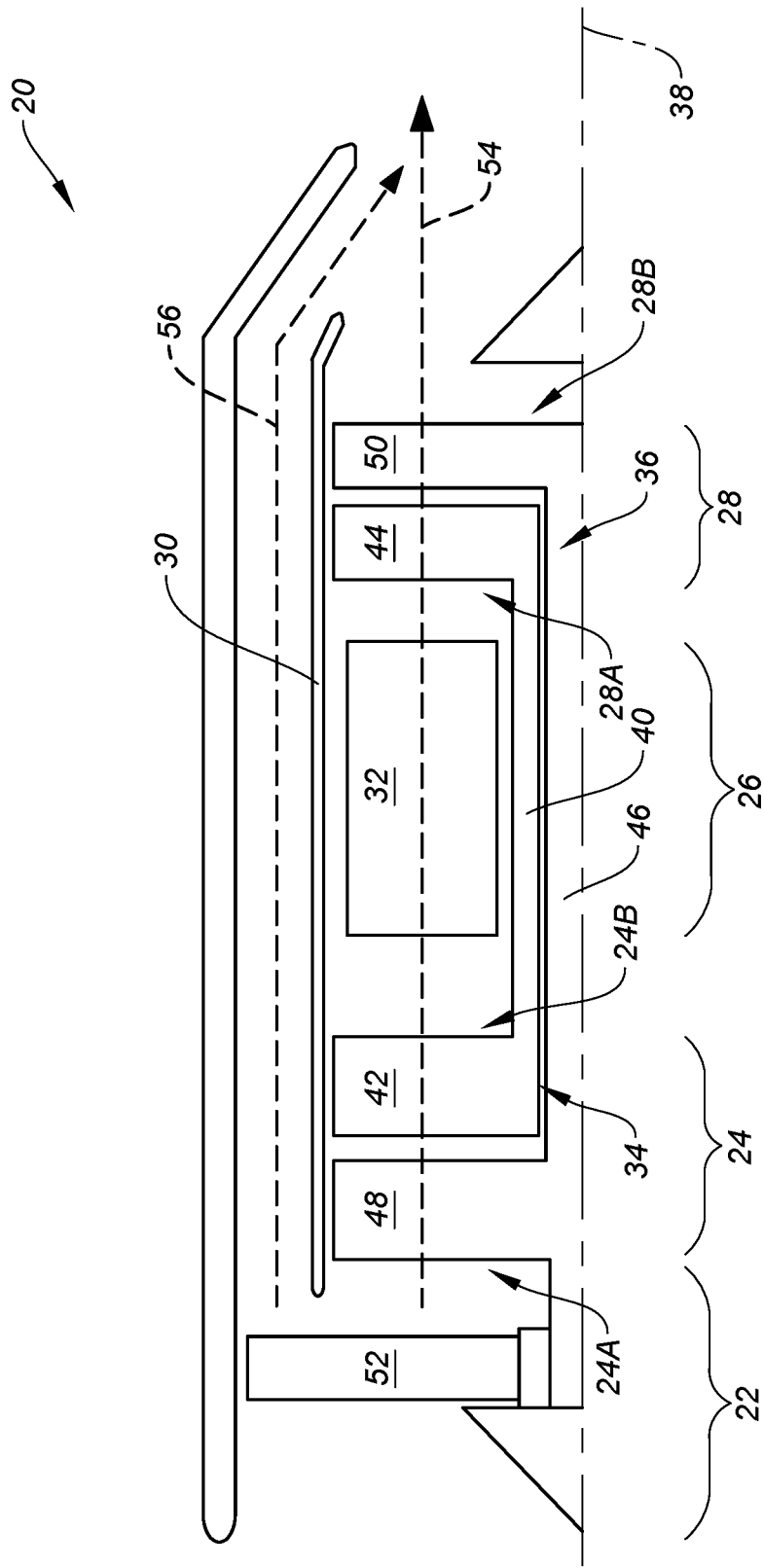
FIG. 1 schematically illustrates a cutaway, side view of a gas turbine engine for an aircraft propulsion system, in accordance with one or more embodiments of the present disclosure.

FIG. 1 schematically illustrates a gas turbine engine 20. The gas turbine engine 20 of FIG. 1 is a multi-spool turbofan gas turbine engine for an aircraft propulsion system. However, while the following description and accompanying drawings may refer to the turbofan gas turbine engine of FIG. 1 as an example, it should be understood that aspects of the present disclosure may be equally applicable to other types of gas turbine engines including, but not limited to, a turboshaft gas turbine engine, a turboprop gas turbine engine, a turbojet gas turbine engine, a propfan gas turbine engine, or an open rotor gas turbine engine.

The gas turbine engine 20 of FIG. 1 includes a fan section 22, a compressor section 24, a combustor section 26, a turbine section 28, and an engine static structure 30. The compressor section 24 of FIG. 1 includes a low-pressure compressor (LPC) 24A and a high-pressure compressor (HPC) 24B. The combustor section 26 includes a combustor 32 (e.g., an annular combustor). The turbine section 28 includes a high-pressure turbine (HPT) 28A and a low-pressure turbine (LPT) 28B.

Components of the fan section 22, the compressor section 24, and the turbine section 28 form a first rotational assembly 34 (e.g., a high-pressure spool) and a second rotational assembly 36 (e.g., a low-pressure spool) of the gas turbine engine 20. The first rotational assembly 34 and the second rotational assembly 36 are mounted for rotation about a rotational axis 38 (e.g., an axial centerline) of the gas turbine engine 20 relative to the engine static structure 30.

The first rotational assembly 34 includes a first shaft 40, a bladed first compressor rotor 42 for the high-pressure compressor 24B, and a bladed first turbine rotor 44 for the high-pressure turbine 28A. The first shaft 40 interconnects the bladed first compressor rotor 42 and the bladed first turbine rotor 44.

The second rotational assembly 36 includes a second shaft 46, a bladed second compressor rotor 48 for the low-pressure compressor 24A, and a bladed second turbine rotor 50 for the low-pressure turbine 28B. The second shaft 46 interconnects the bladed second compressor rotor 48 and the bladed second turbine rotor 50. The second shaft 46 may additionally be directly or indirectly coupled to a bladed fan rotor 52 for the fan section 22. For example, the second shaft 46 may be coupled to the bladed fan rotor 52 (e.g., an input shaft of the bladed fan rotor 52) by a reduction gear assembly configured to drive the bladed fan rotor 52 at a reduced rotational speed relative to the second shaft 46. The first shaft 40 and the second shaft 46 are concentric and configured to rotate about the rotational axis 38. The present disclosure, however, is not limited to concentric configurations of the first shaft 40 and the second shaft 46.

The engine static structure 30 may include one or more engine cases, cowlings, bearing assemblies, and/or other non-rotating structures configured to house and/or support (e.g., rotationally support) components of the gas turbine engine 20 sections 22, 24, 26, 28. The engine static structure 30 may form an exterior (e.g., an outer radial portion) of the gas turbine engine 20.

In operation of the gas turbine engine 20 of FIG. 1, ambient air is directed through the fan section 22 and into a core flow path 54 (e.g., an annular flow path) and a bypass flow path 56 (e.g., an annular flow path) by rotation of the bladed fan rotor 52. Airflow along the core flow path 54 is compressed by the low-pressure compressor 24A and the high-pressure compressor 24B, mixed and burned with fuel in the combustor 32, and then directed through the high-pressure turbine 28A and the low-pressure turbine 28B. The bladed first turbine rotor 44 and the bladed second turbine rotor 50 rotationally drive the first rotational assembly 34 and the second rotational assembly 36, respectively, in response to the combustion gas flow through the high-pressure turbine 28A and the low-pressure turbine 28B. The bypass flow path 56 may be disposed outside the engine static structure 30. For example, the engine static structure 30 and an outer aircraft propulsion system housing (e.g., a nacelle) may form an annular bypass duct radially therebetween, and airflow may be directed through the annular bypass duct along the bypass flow path 56.

Figure 2:
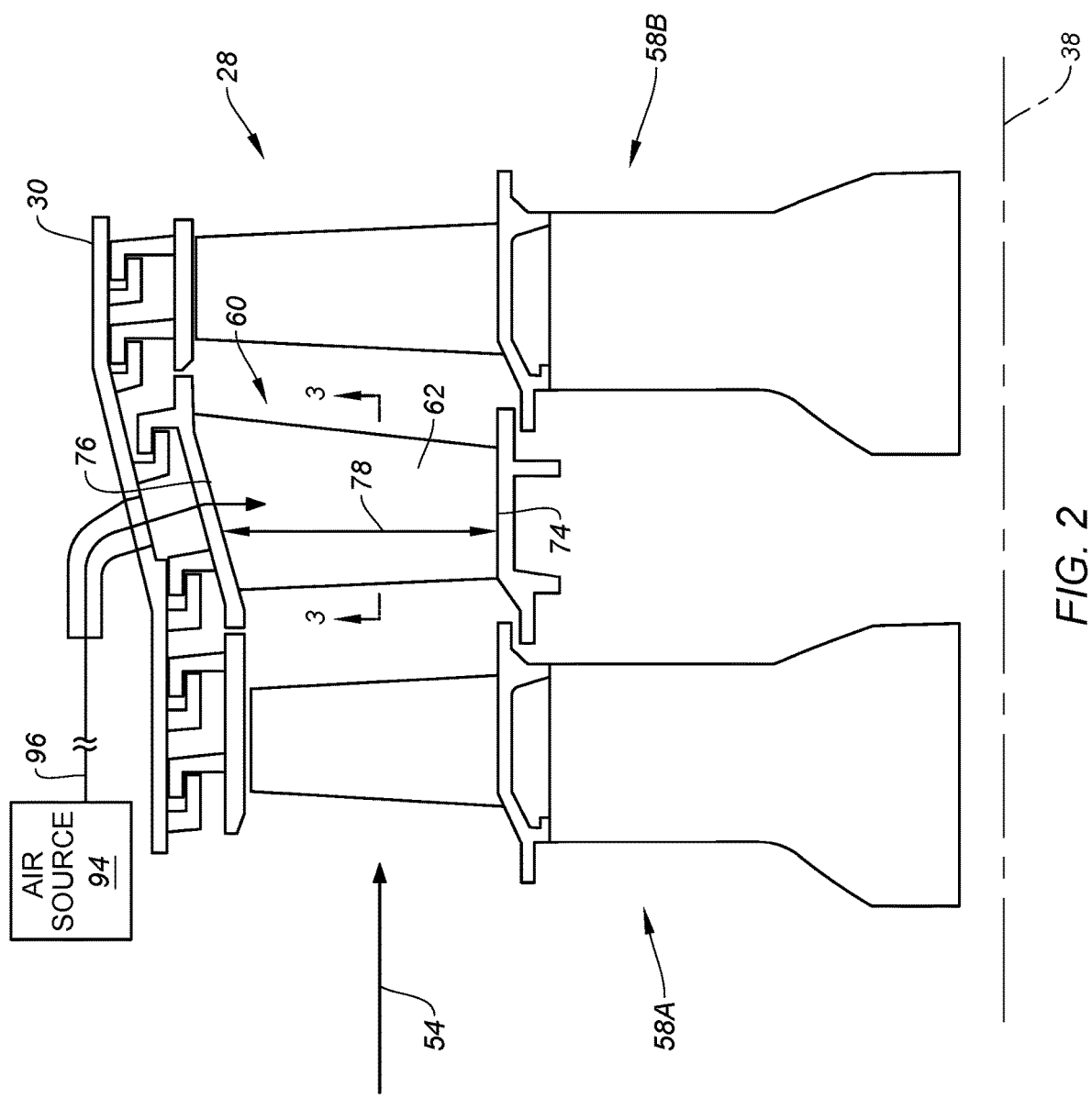
FIG. 2 schematically illustrates a portion of a turbine section for a gas turbine engine, in accordance with one or more embodiments of the present disclosure.

FIG. 2 illustrates a cutaway, side view of a portion of the turbine section 28 including a bladed turbine rotor 58 (e.g., the bladed first turbine rotor 44 or the bladed second turbine rotor 50) and a turbine vane stage 60. The bladed turbine rotor 58 of FIG. 2 includes a first turbine blade stage 58A and a second turbine blade stage 58B. The present disclosure, however, is not limited to any particular number of turbine blade stages for a bladed turbine rotor. Each of the first turbine blade stage 58A and the second turbine blade stage 58B include a plurality of turbine blades arrayed circumferentially about the rotational axis 38. The first turbine blade stage 58A is disposed upstream (e.g., axially forward) of the turbine vane stage 60 relative to the core flow path 54. The second turbine blade stage 58B is disposed downstream (e.g., axially aft) of the turbine vane stage 60 relative to the core flow path 54. The turbine vane stage 60 includes a plurality of vanes 62 arrayed circumferentially about the rotational axis 38. The vanes 62 may be directly or indirectly mounted to a portion of the engine static structure 30 (e.g., an engine case).

Figure 3:
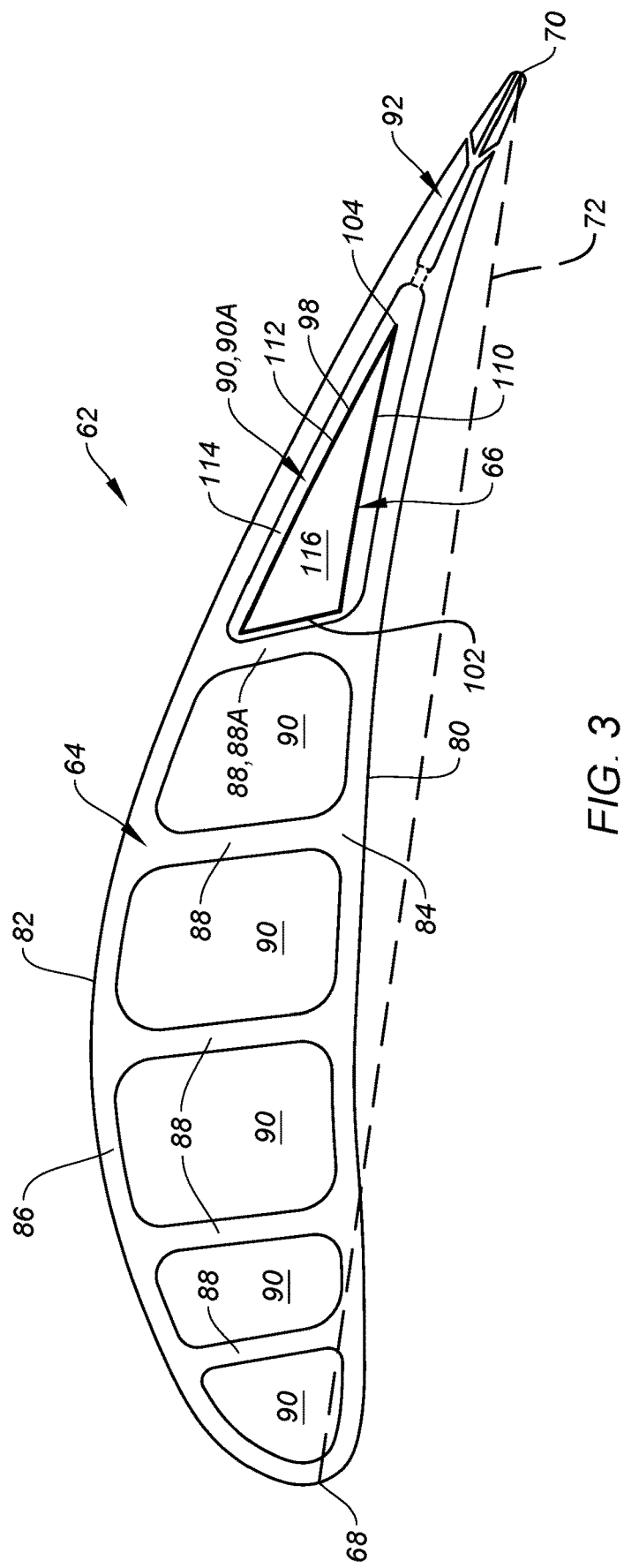
FIG. 3 schematically illustrates a cross-sectional view of a turbine vane taken along Line 3-3 of FIG. 2, in accordance with one or more embodiments of the present disclosure.

Referring to FIGS. 2 and 3, the one, more than one, or each of the vanes 62 includes a vane body 64 and a baffle 66 disposed within the vane body 64. FIG. 3 illustrates a cross-sectional view of one of the vanes 62 taken along Line 3-3 of FIG. 2.

As shown in FIG. 3, the vane body 64 forms an airfoil shape of the vanes 62. The vane body 64 extends between and to a leading edge 68 of the vane body 64 and a trailing edge 70 of the vane body 64. A chord line 72 of the vane body 64 may be understood as extending through and intersecting the leading edge 68 and the trailing edge 70. The vane body 64 extends between and to an inner diameter (ID) end 74 of the vane body 64 and an outer diameter (OD) end 76 of the vane body 64. The vane body 64 has a span 78 extending between and to the ID end 74 and the OD end 76, for example, in a radial direction relative to the rotational axis 38. The vane body 64 forms a pressure side surface 80 and a suction side surface 82 opposite the pressure side surface 80. Each of the pressure side surface 80 and the suction side surface 82 extends between and to the leading edge 68 and the trailing edge 70 and between and to the ID end 74 and the OD end 76.

The vane body 64 includes a pressure side wall 84, a suction side wall 86, and one or more internal ribs 88. The pressure side wall 84 forms the pressure side surface 80. The suction side wall 86 forms the suction side surface 82. Each of the ribs 88 extends between and connects the pressure side wall 84 and the suction side wall 86. For example, each of the ribs 88 may extend transversely between and connect the pressure side wall 84 and the suction side wall 86, as shown in FIG. 3. The ribs 88 may be arrayed in the chordwise direction relative to the chord line 72.

The vane body 64 forms one or more internal cooling passages 90 and a plurality of cooling holes 92. Each of the cooling passages 90 is formed by and between the pressure side wall 84, the suction side wall 86, and one or more of the ribs 88. The cooling passages 90 may be arrayed in the chordwise direction relative to the chord line 72. Each cooling passage 90 may be separated from a chordwise adjacent cooling passage 90 by one of the ribs 88. The cooling passages 90 include a trailing edge cooling passage 90A. The trailing edge cooling passage 90A is disposed proximate the trailing edge 70 relative to the other cooling passages 90 in the chordwise direction. The trailing edge cooling passage 90A extends spanwise from the OD end 76 to or toward the ID end 74. The cooling holes 92 are connected in fluid communication with the trailing edge cooling passage 90A. Each of the cooling holes 92 may extend between and to the trailing edge cooling passage 90A and a one or more cooling hole outlets. For example, the cooling hole outlets may be disposed at (e.g., on, adjacent, or proximate) the trailing edge 70, the pressure side surface 80 at (e.g., on, adjacent, or proximate) the trailing edge 70, and/or the suction side surface 82 at (e.g., on, adjacent, or proximate) the trailing edge 70. The present disclosure is not limited to the foregoing exemplary configuration of the cooling holes 92 and associated cooling hole outlets, and the cooling holes 92 may additionally or alternatively be configured as pedestal banks, film cooling holes, slots, or the like. As shown in FIG. 2, the vane body 64 (e.g., the trailing edge cooling passage 90A (and others of the cooling passages 90)) is connected in fluid communication with a cooling air source 94 such as, but not limited to, the low-pressure compressor 24A or the high-pressure compressor 24B. The cooling air source 94 of FIG. 2 is configured to direct a pressurized air 96 to the vane body 64 at (e.g., on, adjacent, or proximate) the OD end 76 to facilitate cooling of the vane body 64 (e.g., via the cooling passages 90).

Figure 5:
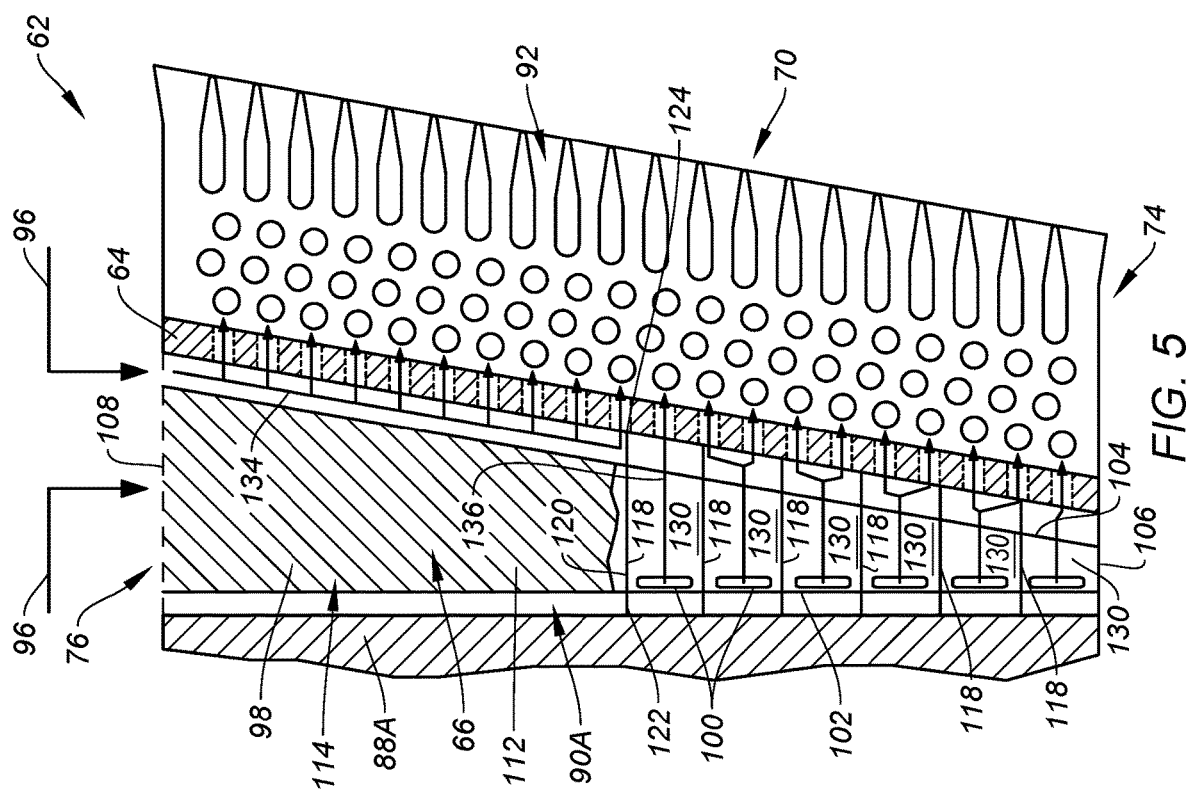
FIG. 5 schematically illustrates a cutaway, side view of the turbine vane of FIG. 3 at a suction side of the turbine vane, in accordance with one or more embodiments of the present disclosure.
Figure 4:
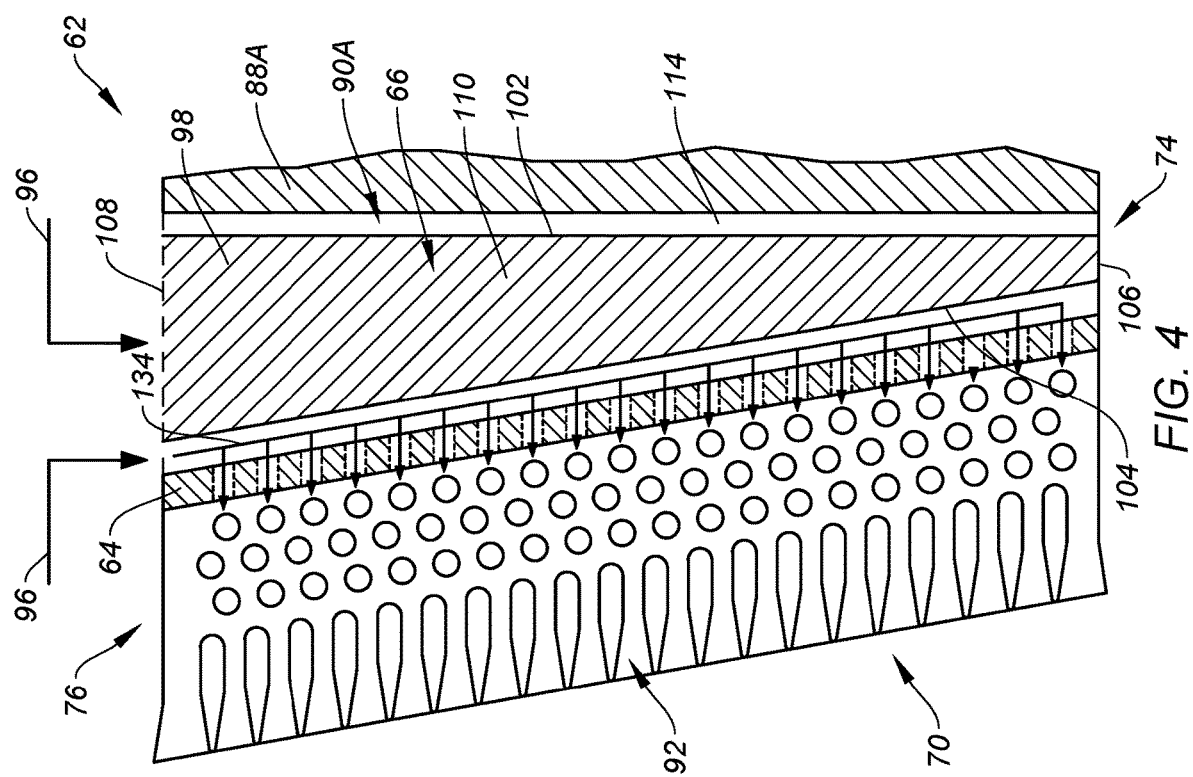
FIG. 4 schematically illustrates a cutaway, side view of the turbine vane of FIG. 3 at a pressure side of the turbine vane, in accordance with one or more embodiments of the present disclosure.

Referring to FIGS. 3-5, the baffle 66 is disposed within the trailing edge cooling passage 90A. FIG. 4 illustrates a cutaway, side view of the vane body 64 and the baffle 66 along a pressure side (e.g., along the pressure side wall 84) of the turbine vane 62. FIG. 5 illustrates a cutaway, side view of the vane body 64 and the baffle 66 along a suction side (e.g., along the suction side wall 86) of the turbine vane 62. The baffle 66 includes a baffle body 98 and a plurality of baffle apertures 100.

The baffle body 98 extends in the chordwise direction between and to a leading end 102 of the baffle body 98 and a trailing end 104 of the baffle body 98. The leading end 102 may be mounted to or otherwise disposed at (e.g., on, adjacent, or proximate) a trailing edge rib 88A of the ribs 88, which trailing edge rib 88A forms a portion of the trailing edge cooling passage 90A. The leading end 102 may alternatively be spaced from the trailing edge rib 88A (e.g., in the chordwise direction) along all or a portion of the span 78. The baffle body 98 extends in the spanwise direction between and to an ID end 106 of the baffle body 98 and an OD end 108 of the baffle body 98. The ID end 106 may be disposed at (e.g., on, adjacent, or proximate) the ID end 74. The OD end 108 may be disposed at (e.g., on, adjacent, or proximate) the OD end 76. The baffle body 98 includes a pressure side 110 and a suction side 112. The pressure side 110 and the suction side 112 extend between the leading end 102 and the trailing end 104 and between the ID end 106 and the OD end 108. The pressure side 110 faces the pressure side wall 84. The suction side 112 faces the suction side wall 86. As shown in FIGS. 4 and 5, the baffle body 98 may have an axial span and/or a circumferential span (e.g., relative to the rotational axis 38) which tapers in a spanwise direction from the OD end 108 to the ID end 106. The present disclosure, however, is not limited to the foregoing exemplary tapered configuration of the baffle body 98 of FIGS. 4 and 5.

The baffle body 98 (e.g., the pressure side 110 and the suction side 112) is spaced from the pressure side wall 84 and the suction side wall 86 within the trailing edge cooling passage 90A to form a feed cavity 114. The feed cavity 114 extends spanwise from the OD end 76 to or toward the ID end 74. The feed cavity 114 is connected in fluid communication with the cooling air source 94 at (e.g., on, adjacent, or proximate) the OD end 76 to receive the pressurized air 96. The feed cavity 114 is disposed at (e.g., on, adjacent, or proximate) the cooling holes 92 and connected in fluid communication with the cooling holes 92.

The baffle body 98 is a hollow body forming an internal baffle cavity 116. The baffle cavity 116 extends spanwise within the baffle body 98 from the OD end 108 to or toward the ID end 106. The baffle body 98 further forms the baffle apertures 100. The baffle apertures 100 of FIG. 5 are disposed on the suction side 112. For example, the baffle apertures 100 may be disposed on the suction side 112 at (e.g., on, adjacent, or proximate) and along the leading end 102. The baffle apertures 100 of FIG. 5 are elongated in the spanwise direction, however, the present disclosure is not limited to any particular size, shape, or number of the baffle apertures 100. The baffle apertures 100 may be arrayed spanwise along all or a spanwise portion of the baffle body 98 on the suction side 112, as will be discussed in further detail. The baffle apertures 100 extend through the baffle body 98 and are connected in fluid communication with the baffle cavity 116. The pressure side 110 and the suction side 112 of the baffle body 98 may be imperforate with the exception of the baffle apertures 100.

Figure 6:
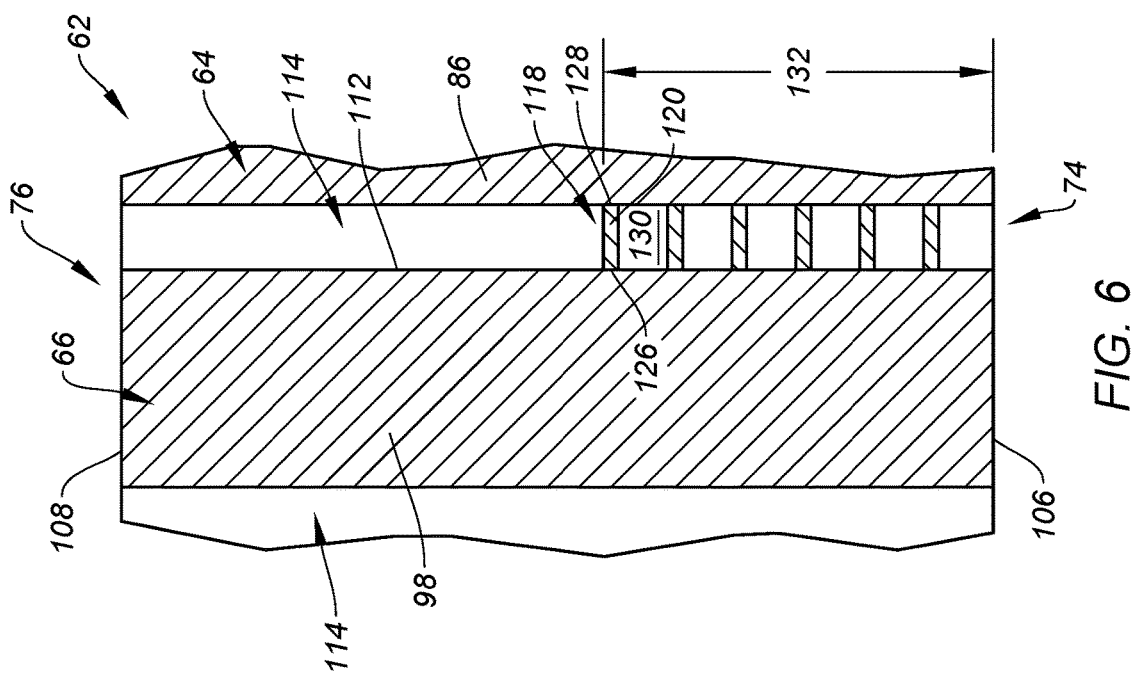
FIG. 6 schematically illustrates another cutaway view of the turbine vane of FIG. 3 at the pressure side, in accordance with one or more embodiments of the present disclosure.

Referring to FIGS. 5 and 6, the turbine vane 62 further includes one or more axial divider ribs 118. Each of the axial divider ribs 118 includes a rib body 120. The rib body 120 extends (e.g., axially extends relative to the rotational axis 38; see FIG. 2) between and to a leading end 122 of the rib body 120 and a trailing end 124 of the rib body 120. For example, the axial divider ribs 118 may extend perpendicular (e.g., substantially perpendicular) to the spanwise direction from the leading end 122 to the trailing end 124. The leading end 122 is disposed at (e.g., on, adjacent, or proximate) the trailing edge rib 88A. The trailing end 124 is disposed at (e.g., on, adjacent, or proximate) an interface of the pressure side wall 84 and the suction side wall 86 within the trailing edge cooling passage 90A, for example, at (e.g., on, adjacent, or proximate) the cooling holes 92. The rib body 120 extends (e.g., in a circumferential or partially circumferential direction relative to the rotational axis 38; see FIG. 2) between and to an inner end 126 of the rib body 120 and an outer end 128 of the rib body 120. The inner end 126 is disposed at (e.g., on, adjacent, or proximate) the baffle body 98 (e.g., the suction side 112). The outer end 128 is disposed at (e.g., on, adjacent, or proximate) the vane body 64 (e.g., the suction side wall 86). The axial divider ribs 118 may be formed by or otherwise mounted to the vane body 64 (e.g., the suction side wall 86). Additionally or alternatively, the axial divider ribs 118 may be formed by or otherwise mounted to the baffle body 98 (e.g., the suction side 112).

The axial divider ribs 118 form one or more axial flow channels 130. In particular, each of the axial flow channels 130 is formed by and between spanwise adjacent axial divider ribs 118. Each of the axial flow channels 130 extends (e.g., axially extends) between and to the leading end 122 and the trailing end 124 of the spanwise adjacent axial divider ribs 118. For example, the axial flow channels 130 may extend perpendicular (e.g., substantially perpendicular) to the spanwise direction from the leading end 122 to the trailing end 124. Each of the axial flow channels 130 is connected in fluid communication with the baffle cavity 116 by one or more of the baffle apertures 100 (e.g., disposed at the respective one of the axial flow channels 130) extending through the baffle body 98 between and to the baffle cavity 116 and a respective one of the axial flow channels 130. The axial flow channels 130 of FIG. 5 are each connected in fluid communication with the baffle cavity 116 by one of the baffle apertures 100. However, the axial flow channels 130 may alternatively be connected in fluid communication with the baffle by more than one of the baffle apertures 100. The axial flow channels 130 are additionally connected in fluid communication with the cooling holes 92. The axial divider ribs 118 (e.g., a radially outmost one of the axial divider ribs 118) further form and axially interrupt the feed cavity 114 between the suction side wall 86 and the suction side 112. In other words, the feed cavity 114, between the suction side wall 86 and the suction side 112, extends from the OD end 76 to the axial divider ribs 118 (e.g., a radially outmost one of the axial divider ribs 118).

As shown in FIGS. 5 and 6, the baffle apertures 100, the axial divider ribs 118, and the associated axial flow channels 130 (e.g., all of the baffle apertures 100, the axial divider ribs 118, and the associated axial flow channels 130) may be disposed within a spanwise portion 132 of the vane body 64 at (e.g., on, adjacent, or proximate) the ID end 74. As shown in FIG. 6, the spanwise portion 132 is a portion of the span 78 of the span 78. For example, the spanwise portion 132 may be less than or equal to fifty percent of the span 78 in the spanwise (e.g., radial) direction.

The axial divider ribs 118 of the turbine vane 62 of FIGS. 4-6 are described above as extending between and to the suction side wall 86 and the suction side 112. The present disclosure, however, is not limited to this forgoing exemplary configuration of the axial divider ribs 118. For example, the axial divider ribs 118 may alternatively extend between and to the pressure side wall 84 and the pressure side 112 (e.g., and not between and to the suction side wall 86 and the suction side 112).

During operation of the gas turbine engine 20 (see FIG. 1), the cooling air source 94 directs the pressurized air 96 to the vane body 64 at (e.g., on, adjacent, or proximate) the OD end 76 to facilitate cooling of the vane body 64 (e.g., via the cooling passages 90), as previously discussed. In particular, the cooling air source 94 is connected in fluid communication with the feed cavity 114 and the baffle cavity 116 to direct the pressurized air 96 into each of the feed cavity 114 and the baffle cavity 116. FIGS. 4 and 5 illustrate an exemplary first air flow path 134 of the pressurized air 96 through the feed cavity 114. The pressurized air 96 along the first air flow path 134 is directed generally radially through the feed cavity 114 from the OD end 76 to or toward the ID end 74. The pressurized air 96 along the first air flow path 134 exits the feed cavity 114, and subsequently the vane body 64, through the cooling holes 94. FIG. 5 illustrates an exemplary second air flow path 136 of the pressurized air 96 into the baffle cavity 116 and through the axial flow channels 130. The pressurized air 96 along the second air flow path 136 is directed generally radially through the baffle cavity 116 from the OD end 108 to or toward the ID end 106. The pressurized air 96 along the second air flow path 136 is directed through the baffle apertures 100, into and through the axial flow channels 130, and exits the feed cavity 114, and subsequently the vane body 64, through the cooling holes 94. The baffle body 98 occupies a substantial volume of the trailing edge cooling passage 90A, thereby increasing the Mach numbers and heat transfer of the cooling pressurized air 96 through the feed cavity 114 and the axial flow channels 130 at (e.g., on, adjacent, or proximate) the vane body 64 (e.g., the pressure side wall 84 and the suction side wall 86). The location of the axial divider ribs 118 and associated axial flow channels 130 within the spanwise portion 132 at the ID end 74 facilitates improved effectiveness of the pressurized air 96 for cooling this lower heat load region of the turbine vane 62 (e.g., at the suction side and trailing edge). However, this increased heat transfer can lead to higher cooling air heat-up which may adversely affect the vane body 64 metal temperatures near the ID portion of the vane body 64. Accordingly, to minimize cooling air temperature at the ID portion of the vane body 64, a portion of the pressurized cooling air 96 travels radially inward and through the baffle cavity 116, where it is insulated from the external gas temperatures and excessive heat-up by the baffle body 98 before exiting the baffle cavity 116 through the baffle apertures 100 to begin cooling the ID portion of the vane body 64.

Figure 7:
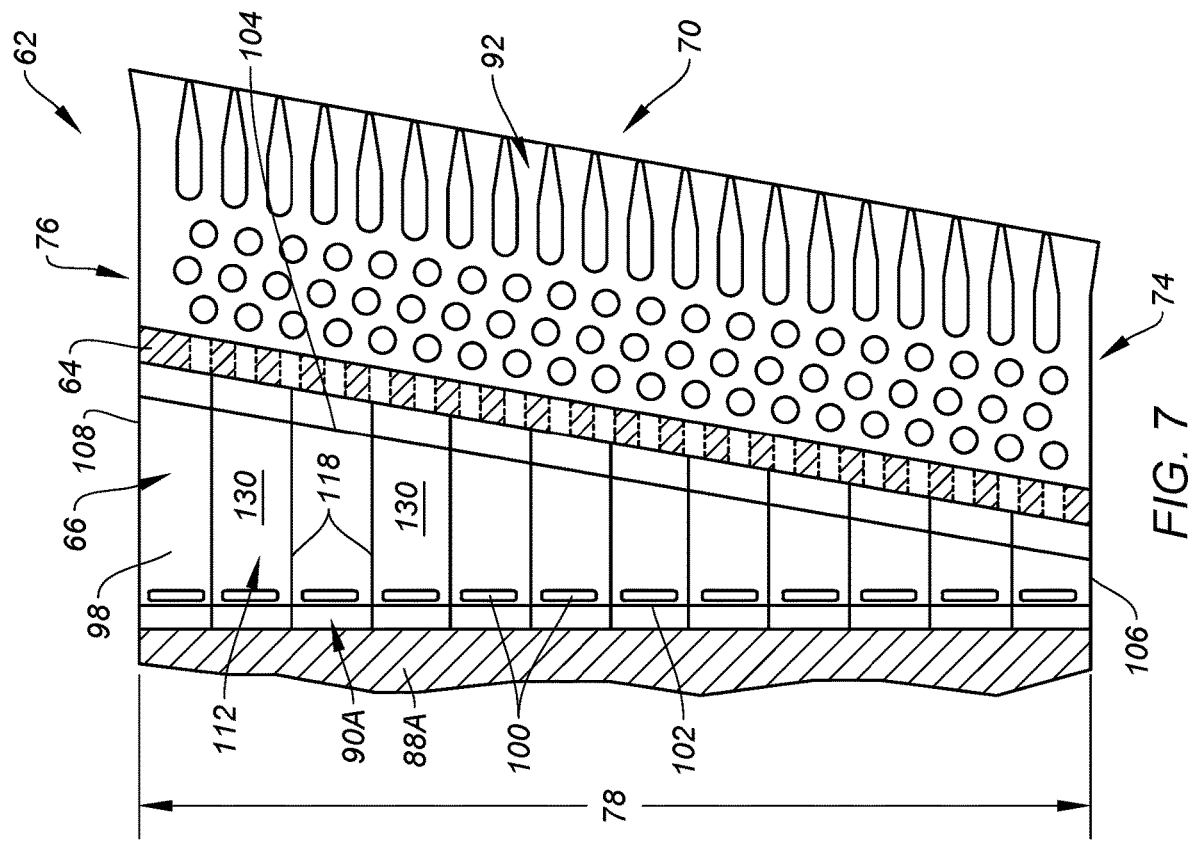
FIG. 7 schematically illustrates a cutaway, side view of another turbine vane, in accordance with one or more embodiments of the present disclosure.

Referring to FIG. 7, in some embodiments, the baffle apertures 100, the axial divider ribs 118, and the associated axial flow channels 130 may be disposed along all or a substantial portion of the span 78 of the vane body 64.

Referring to FIGS. 8 and 9, in some embodiments, the turbine vane 62 may include flow augmentation features 138 disposed within the feed cavity 114 and/or flow augmentation features 140 disposed within the axial flow channels 130. The flow augmentation features 138, 140 are configured to promote air flow turbulence within the feed cavity 114 and the axial flow channels 130, respectively, to facilitate improved cooling effectiveness for the vane body 64. The flow augmentation features 138 may include turbulence promoting structures such as, but not limited to, trip strips, pin fins, columns, and the like. The flow augmentation features 138 may be formed by or otherwise connected to the vane body 64 (e.g., the pressure side wall 84 and/or the suction side wall 86; see FIG. 3), the baffle body 98, or both of the vane body 64 and the baffle body 98. The flow augmentation features 138, 140 may extend between and connect the vane body 64 and the baffle body 98.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

What is claimed is:

1. A turbine vane for a gas turbine engine, the turbine vane comprising:
    a vane body, the vane body extends between and to a leading edge and a trailing edge, the vane body extends between and to an inner diameter vane end and an outer diameter vane end, the vane body includes a first side wall, a second side wall, and a trailing edge rib, the trailing edge rib extends between and connects the first side wall and the second side wall, the trailing edge rib extending radially from the inner diameter vane end toward the outer diameter vane end, the first side wall, the second side wall, and the trailing edge rib form a cooling passage at the trailing edge, and the vane body further forms a plurality of cooling holes at the trailing edge;
    a baffle including a baffle body, the baffle body is disposed within the cooling passage, the baffle body includes a first baffle side and a second baffle side, the first baffle side faces the first side wall, the second baffle side faces the second side wall, the baffle body forms an internal baffle cavity, the baffle body further forms a plurality of baffle apertures connected in fluid communication with the internal baffle cavity, and the plurality of baffle apertures are disposed at the second baffle side; and
    a plurality of axial divider ribs, each axial divider rib of the plurality of axial divider ribs extends between and to a leading divider end and a trailing divider end, the leading divider end is disposed at the trailing edge rib, the trailing divider end is disposed adjacent the plurality of cooling holes, each axial divider rib of the plurality of axial divider ribs extends between an inner end and an outer end, the outer end disposed at the second side wall, and the inner end disposed at the second baffle side; and the vane body, the baffle body, and the axial divider ribs form a feed cavity and one or more axial flow channels, the feed cavity is disposed between the vane body and the baffle body at least between the first side wall and the first baffle side, the feed cavity is connected in fluid communication with the plurality of cooling holes, each axial flow channel of the one or more axial flow channels is formed by and between adjacent axial divider ribs of the plurality of axial divider ribs, each axial flow channel of the one or more axial flow channels is connected in fluid communication with the internal baffle cavity by one or more of the plurality of baffle apertures, and each axial flow channel of the one or more axial flow channels is connected in fluid communication with the plurality of cooling holes; and wherein the inner end contacts the second baffle side and the outer end contacts the second side wall.

2. The turbine vane of claim 1, wherein the baffle body extends between a leading baffle end and a trailing baffle end, the leading baffle end is disposed at the trailing edge rib, the plurality of baffle apertures are disposed on the second baffle side at the leading baffle end.

3. The turbine vane of claim 1, wherein the vane body has a span extending between and to the inner diameter vane end and the outer diameter vane end, and the baffle apertures, the plurality of axial divider ribs, and the one or more axial flow channels are disposed within a spanwise portion of the span at the inner diameter vane end.

4. The turbine vane of claim 3, wherein the spanwise portion is less than or equal to fifty percent of the span.

5. The turbine vane of claim 1, wherein the first side wall is a pressure side wall of the vane body and the second side wall is a suction side wall of the vane body, the pressure side wall forms a pressure side surface of the turbine vane, and the suction side wall forms a suction side surface of the turbine vane.

6. The turbine vane of claim 1, further comprising flow augmentation features disposed in the feed cavity, and the flow augmentation features are formed by one or both of the vane body and the baffle body.

7. The turbine vane of claim 1, further comprising flow augmentation features disposed in each axial flow channel of the one or more axial flow channels, and the flow augmentation features are formed by one or both of the vane body and the baffle body.

8. The turbine vane of claim 1, wherein the feed cavity is further disposed between the second side wall and the second baffle side, and the feed cavity, between the second side wall and the second baffle side, extends from the outer diameter vane end to the plurality of axial divider ribs.

9. The turbine vane of claim 1, wherein the baffle body extends between and to an inner diameter baffle end and an outer diameter baffle end, the inner diameter baffle end is disposed at the inner diameter vane end, and the outer diameter baffle end is disposed at the outer diameter vane end.

10. The turbine vane of claim 1, wherein the plurality of axial divider ribs are mounted to the baffle body.

11. A gas turbine engine for an aircraft propulsion system, the gas turbine engine comprising:
a compressor section; and
a turbine section, the turbine section including a turbine vane stage, the turbine vane stage including a plurality of turbine vanes, and a first turbine vane of the plurality of turbine vanes including:
a vane body, the vane body extends between and to a leading edge and a trailing edge, the vane body extends between and to an inner diameter vane end and an outer diameter vane end, the vane body includes a first side wall, a second side wall, and a trailing edge rib, the first side wall, the second side wall, and the trailing edge rib form a cooling passage at the trailing edge, and the vane body further forms a plurality of cooling holes at the trailing edge;
a baffle including a baffle body, the baffle body is disposed within the cooling passage, the baffle body includes a first baffle side and a second baffle side, the baffle body forms an internal baffle cavity, the internal baffle cavity is connected in fluid communication with the compressor section at the outer diameter vane end, the baffle body further forms a plurality of baffle apertures disposed at the second baffle side; and
a plurality of axial divider ribs, each axial divider rib of the plurality of axial divider ribs extends between an inner end and an outer end, and to the outer end disposed at and contacting the second side wall, and the inner end disposed at and contacting the second baffle side; and
the vane body, the baffle body, and the axial divider ribs form a feed cavity and one or more axial flow channels, the feed cavity is connected in fluid communication with the compressor section at the outer diameter vane end, the feed cavity is disposed between the vane body and the baffle body, the feed cavity is connected in fluid communication with the plurality of cooling holes, each axial flow channel of the one or more axial flow channels is formed by and between adjacent axial divider ribs of the plurality of axial divider ribs, each axial flow channel of the one or more axial flow channels is connected in fluid communication with the internal baffle cavity by one or more of the plurality of baffle apertures, and each axial flow channel of the one or more axial flow channels is connected in fluid communication with the plurality of cooling holes.

12. The gas turbine engine of claim 11, wherein the first turbine vane forms a first air flow path of pressurized air from the compressor section, the first air flow path extending from the outer diameter vane end, through the feed cavity to the plurality of cooling holes, and out of the first turbine vane from the plurality of cooling holes.

13. The gas turbine engine of claim 12, wherein the first turbine vane forms a second air flow path of the pressurized air from the compressor section, the second air flow path extending from the outer diameter vane end, through the baffle cavity, through the plurality of baffle apertures to the one or more axial flow channels, through the one or more axial flow channels to the plurality of cooling holes, and out of the first turbine vane from the plurality of cooling holes.

14. The gas turbine engine of claim 11, wherein the vane body has a span extending between and to the inner diameter vane end and the outer diameter vane end, and the baffle apertures, the plurality of axial divider ribs, and the one or more axial flow channels are disposed within a spanwise portion of the span at the inner diameter vane end.

15. The gas turbine engine of claim 11, wherein the first side wall is a pressure side wall of the vane body and the second side wall is a suction side wall of the vane body, the pressure side wall forms a pressure side surface of the first turbine vane, and the suction side wall forms a suction side surface of the first turbine vane.

16. A turbine vane for a gas turbine engine, the turbine vane comprising:

a vane body, the vane body extends between and to a leading edge and a trailing edge, the vane body including a span extends in a spanwise direction between and to an inner diameter vane end and an outer diameter vane end, the vane body includes a first side wall, a second side wall, and a trailing edge rib, the first side wall, the second side wall, and the trailing edge rib form a cooling passage at the trailing edge, and the vane body further forms a plurality of cooling holes at the trailing edge;

a baffle including a baffle body, the baffle body is disposed within the cooling passage, the baffle body includes a first baffle side and a second baffle side, the baffle body forms an internal baffle cavity, the baffle body extends along the trailing edge rib between and to an inner diameter baffle end and an outer diameter baffle end, the baffle body further forms a plurality of baffle apertures, and the plurality of baffle apertures are disposed at the second baffle side; and a plurality of axial divider ribs, each axial divider rib of the plurality of axial divider ribs extends between and to a leading divider end and a trailing divider end, the leading divider end is disposed at the trailing edge rib, the trailing divider end is disposed adjacent the plurality of cooling holes, and each axial divider rib of the plurality of axial divider ribs extends between and to the second side wall and the second baffle side;

the vane body, the baffle body, and the axial divider ribs form a feed cavity and one or more axial flow channels, the feed cavity is disposed between the vane body and the baffle body outside of the one or more axial flow channels, the feed cavity is connected in fluid communication with the plurality of cooling holes, each axial flow channel of the one or more axial flow channels is formed by and between adjacent axial divider ribs of the plurality of axial divider ribs, the one or more axial flow channels extend perpendicular to the spanwise direction from the leading divider end to the trailing divider end, each axial flow channel of the one or more axial flow channels is connected in fluid communication with the internal baffle cavity by one or more of the plurality of baffle apertures, and each axial flow channel of the one or more axial flow channels is connected in fluid communication with the plurality of cooling holes;

wherein the plurality of axial divider ribs are disposed only within a spanwise portion of the span at the inner diameter vane end; and wherein the feed cavity is further disposed between the second side wall and the second baffle side, and the feed cavity between the second side wall and the second baffle side extends from the outer diameter vane end to the plurality of axial divider ribs.

17. The turbine vane of claim 16, wherein the baffle body extends between a leading baffle end and a trailing baffle end, the leading baffle end is disposed at the trailing edge rib, the plurality of baffle apertures are disposed on the second baffle side at the leading baffle end.

18. The turbine vane of claim 16, wherein the first side wall is a pressure side wall of the vane body and the second side wall is a suction side wall of the vane body, the pressure side wall forms a pressure side surface of the turbine vane, and the suction side wall forms a suction side surface of the turbine vane.

19. The turbine vane of claim 16, wherein, the inner diameter baffle end is disposed at the inner diameter vane end, and the outer diameter baffle end is disposed at the outer diameter vane end.

* * * * *